United States Patent [19]

Vidjak et al.

[11] 3,749,000
[45] July 31, 1973

[54] COOKING TRAY SET

[75] Inventors: Frank V. Vidjak; Lothar Mikalansky, both of Long Beach, Calif.

[73] Assignee: Star-Kist Foods, Inc., Terminal Island, Calif.

[22] Filed: Mar. 15, 1971

[21] Appl. No.: 124,106

[52] U.S. Cl. ................................. 99/425, 99/448
[51] Int. Cl..... A23l 1/325, A47j 37/10, A47j 27/13
[58] Field of Search...................... 99/425, 422, 432, 99/444, 448; 220/DIG. 6, 97 R, 97 C

[56] References Cited
UNITED STATES PATENTS

| 282,542 | 8/1883 | Lockwood | 99/448 |
|---|---|---|---|
| 519,580 | 5/1894 | Kelsey | 99/448 |
| 1,190,203 | 7/1916 | Sorge | 220/97 R UX |
| 1,222,390 | 4/1917 | Gorham et al. | 99/425 UX |
| 1,531,569 | 3/1925 | Rade | 99/432 X |
| 2,704,974 | 3/1955 | Setman | 99/422 |
| 3,509,813 | 5/1970 | Appelt | 99/432 |

FOREIGN PATENTS OR APPLICATIONS

| 279,270 | 3/1952 | Switzerland | 99/432 |
|---|---|---|---|

Primary Examiner—Wayne A. Morse, Jr.
Assistant Examiner—Arthur O. Henderson
Attorney—Fulwider, Patton, Rieber, Lee & Utecht

[57] ABSTRACT

A set of cooking trays for cooking juicy foods such as tuna fish and including a plurality of tray bodies having bottom walls formed with respective raised central support sheets having recessed drain channels extending around the peripheries thereof for receipt of cooking juices drained from the respective sheets. Side walls surround the respective channels and are formed with outlets in their respective lower extremities for passage of cooking juices collected in such channels whereby the trays may be supported in vertically stacked relationship with the food supported on the sheets of the lower trays in a particular stack being disposed directly beneath the sheets of the respective upper trays of such stack to thereby protect such food from the cooking juices which collect in the respective channels and pour outwardly through the respective outlets during cooking of such food.

9 Claims, 8 Drawing Figures

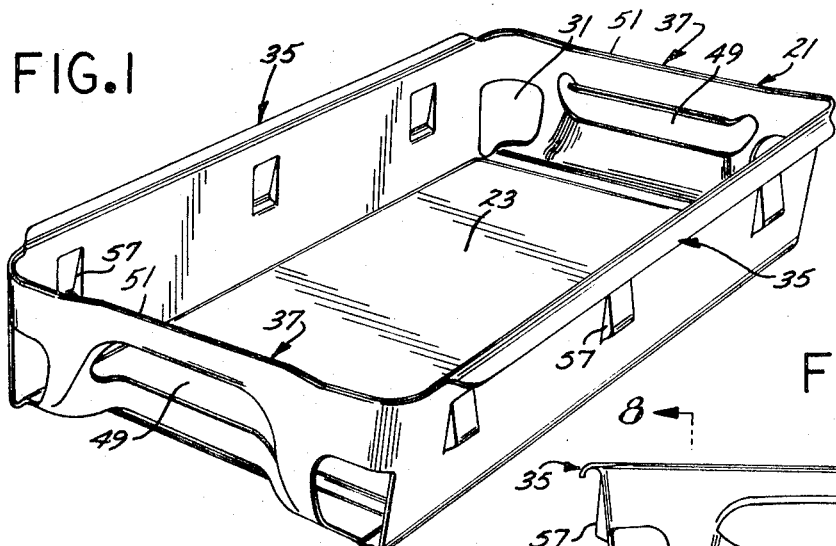
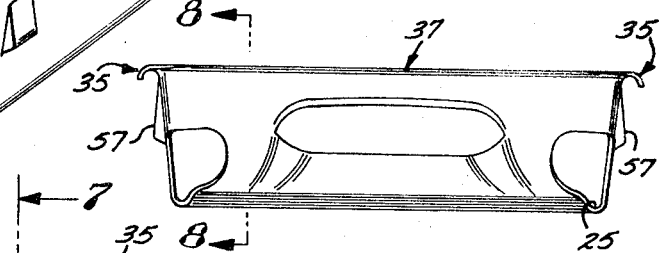
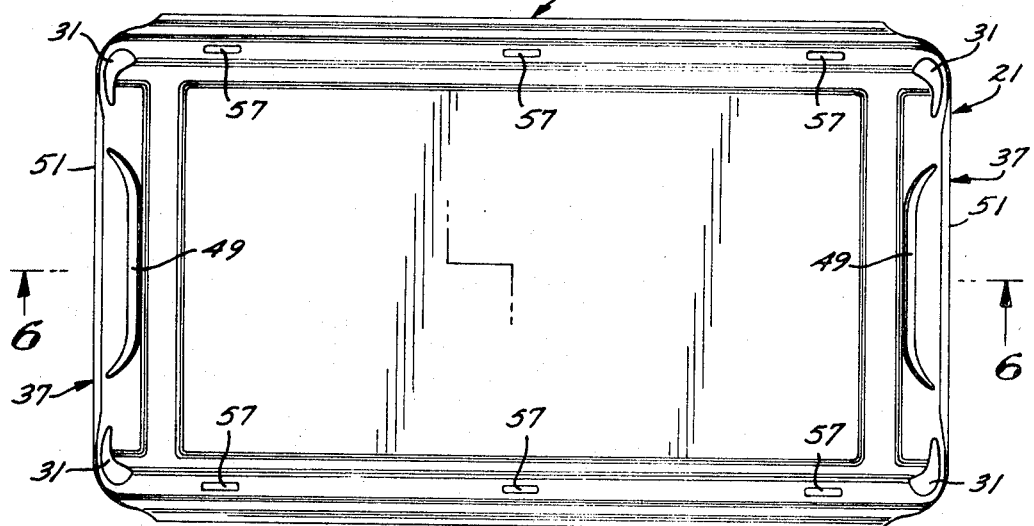
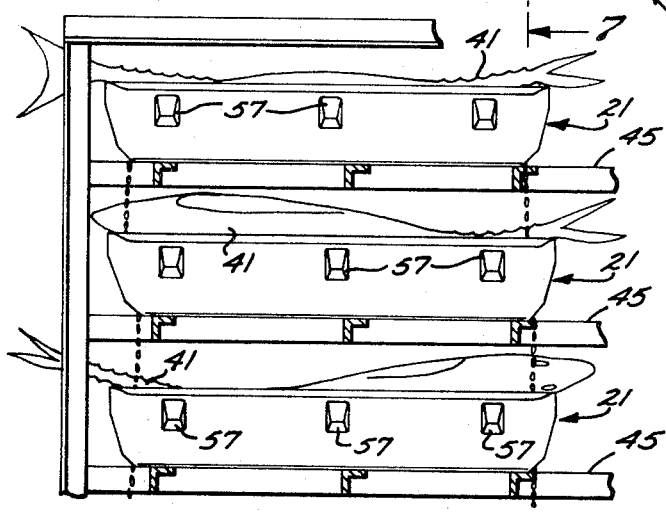

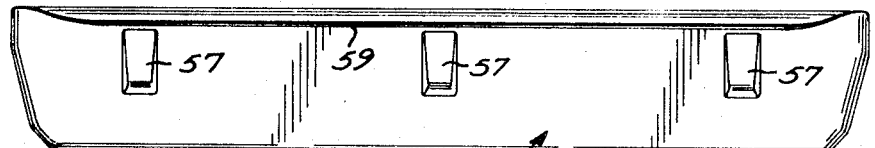
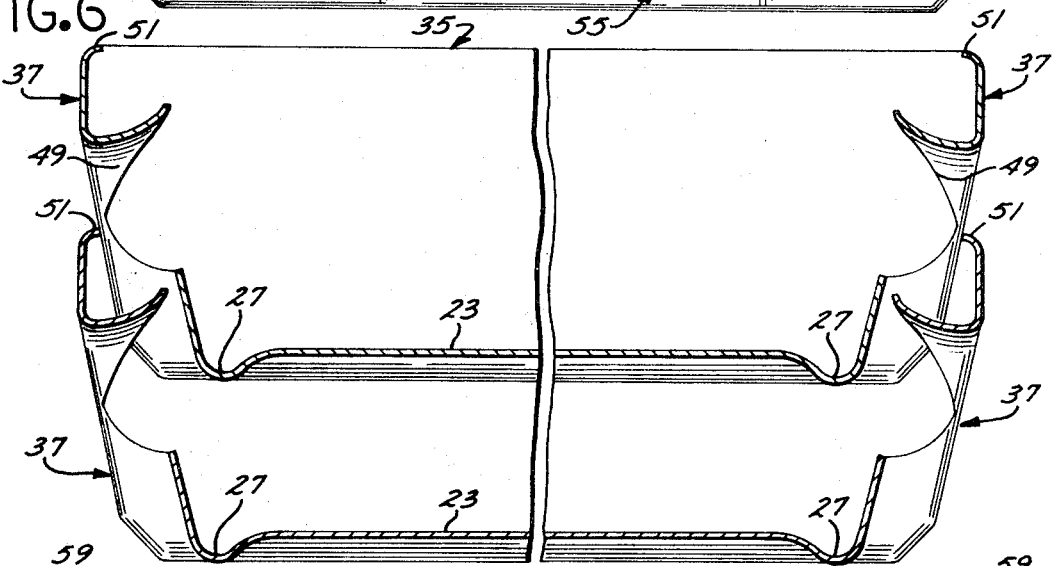
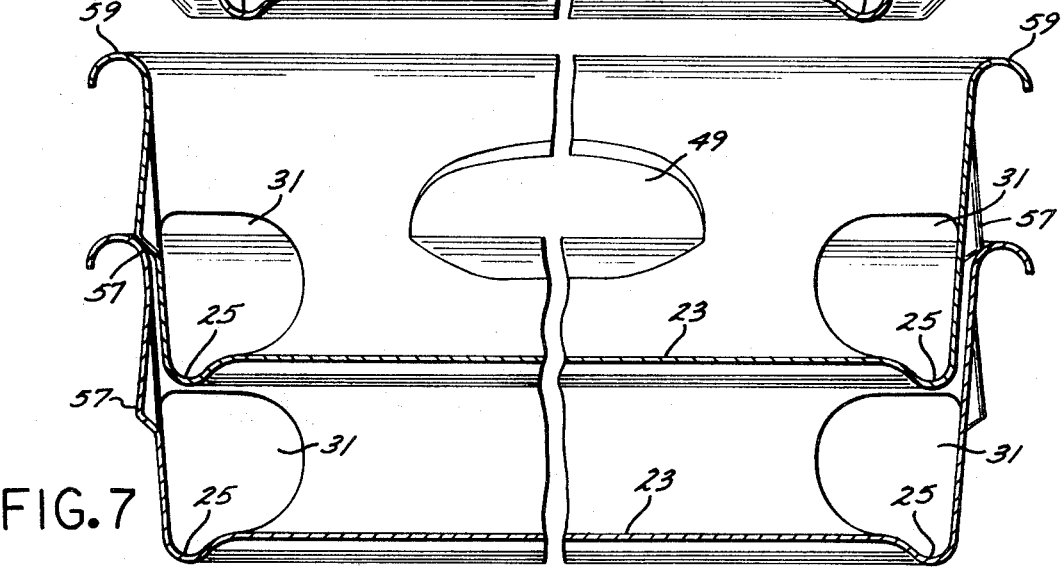
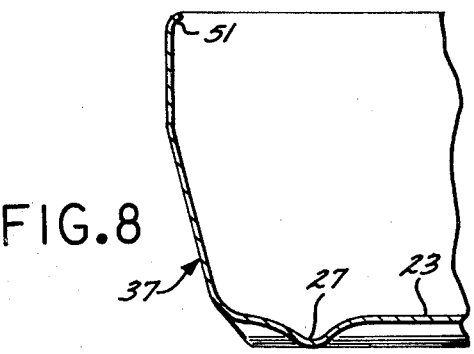

COOKING TRAY SET

BACKGROUND OF THE INVENTION

1. Field of the Invention

The present invention relates to cooking trays which may be used for commercial cooking of tuna fish or the like.

2. Description of the Prior Art

It has been common practice in the tuna canning industry to cook the tuna fish in wire baskets which are disposed in vertically stacked relationship on racks disposed in a large volume cooker. Cooking baskets of this type suffer the shortcoming that the juices from the tuna fish in the upper baskets drip downwardly on fish of the lower baskets thereby excessively basting the fish of the lower baskets and damaging the meat thereof. Further, the wire mesh of such baskets imprint a pattern of burned or overdone flesh in the fish being cooked thereby resulting in wasting of such overcooked or burned meat. Further, such wire tuna baskets frequently are very difficult to clean and the charred residue left thereon damages tuna fish subsequently cooked in such baskets.

SUMMARY OF THE INVENTION

The set of cooking trays of present invention is characterized by tray bodies which have bottom walls formed with raised central sheets surrounded by peripheral drain channels which lead to outlets in the side walls of such trays whereby the cooking juices generated during cooking of food supported on such sheets will be collected in the channels and drained off through the outlets to thereby protect food disposed in trays located immediately below such sheets from the hot cooking juices.

An object of the present invention is to provide a set of tuna trays which are convenient to clean after each cooking.

Another object of the present invention is to provide a set of tuna trays of the type described which can be conveniently nested together in stacked relationship for storage.

A further object of the present invention is to provide a set of tuna trays of the type described which support the cooking food on unperforated sheets to thereby avoid formation of an imprint on the surface of the food during cooking thereof.

These and other objects and the advantages of the present invention will become apparent from a consideration of the following detailed description when taken in conjunction with the accompanying drawings.

DESCRIPTION OF THE DRAWINGS

FIG. 1 is a perspective view of a cooking tray embodying the present invention;

FIG. 2 is a top planned view of a stack of cooking trays similiar to that shown in FIG. 1;

FIG. 3 is an end view of the cooking trays shown in FIG. 1;

FIG. 4 is an elevational view of a set of tuna trays similiar to that shown in FIG. 1, but in reduced scale;

FIG. 5 is a side view of the tuna tray shown in FIG. 1;

FIG. 6 is a vertical sectional view, in enlarged scale, taken along the line 6—6 of FIG. 2 and showing a pair of cooking trays nested together for storage;

FIG. 7 is a vertical sectional view, in enlarged scale, taken along the line 7—7 of FIG. 2 and showing a pair of cooking trays of present invention nested together for storage; and FIG. 8 is a vertical sectional view, in enlarged scale, taken along the line 8—8 of FIG. 3.

DESCRIPTION OF THE PREFERRED EMBODIMENT

Referring to FIGS. 1 and 7, the cooking trays included in the set of present invention include, generally a tray body 21 having a bottom wall in the form of a central raised flat sheet 23 surrounded by peripheral side and end drain channels 25 and 27 respectively. The side and end drain channels 25 and 27 terminate at respective outlets 31 formed in the corners defined between respective side and end walls 35 and 37. Consequently, tuna fish 41 may be placed on the respective food-support sheets 23 of each tray of the set and the entire set placed on racks 45 in a large volume commercial cooker with such trays disposed in stacked relationship such that the trays of each stack are arranged directly over one another. The cooking juices will then collect in the drain channels 25 and 27 and will be poured out the outlets 31 to fall downwardly in the cooker and bypass the tuna supported in the trays aligned directly therebelow.

The tray bodies 21 may conveniently be formed from drawn sheet metal such as stainless steel and each includes a slightly raised unperforated flat food-supporting sheet 23 forming the bottom wall thereof and surrounded by the recessed side and end drain channels 25 and 27. The respective side and end walls 35 and 37 slope upwardly and outwardly and the end walls 37 are formed centrally with depressed handles 49 (FIG. 6) and terminate in their upper extremities with sightly inturned lips 51.

Referring to FIGS. 3 and 6, the side walls 35 are formed centrally along their height with a plurality of ears 57 and then turn outwardly and form turned-back upper flanges 59 whereby the trays may be nested in one another and the ears will limit telescoping together of such trays.

It has been determined that a convenient size tray for tuna fish cooking is a tray approximately 15 inches wide and 33 inches long. While the head or tail of the larger tuna fish may overhang the ends of the trays, it has been found that the damage normally done to such heads or tails by falling hot cooking juices is not deleterious to the tuna flesh itself.

In operation, the tray bodies are coated with a vegetable releasing agent, such as soybean oil, and the cleaned tuna fish 41 positioned with their central bodies disposed on the food-support sheets 23. The respective baskets of the set to be used in a particular cooker are then placed on the racks 45 of such cooker and arranged in stacked relationship to form columns of trays. After the cooker has been loaded, hot cooking steam is introduced thereto and cooking of the tuna fish 41 commenced. As the tuna fish cook the cooking juices released therefrom is drained off the sheet 23 into the drain channels 25 and 27 and is conducted along such channels to the openings 31 formed at the ends thereof. Referring to FIG. 4, it will be observed that the juices so drained off the upper trays 21 will fall downwardly past the tuna 41 in the lower trays thereby avoiding direct contact with such tuna in the lower trays. This feature is particularly advantageous in the cooking of tuna since continuous dripping of hot juices on the same spot of a tuna fish dissolves the tuna flesh and gouges out a channel thereby washing away a portion of the flesh and resulting in loss of additional flesh when the skin is removed from the tuna fish and cleaning thereof completed.

It will also be appreciated that the supporting of the tuna on the flat-support sheets 23 provides for uniform support thereby preventing the formation of a pattern of indentations which normally results from cooking of tuna fish in a basket formed by a wire gridwork which results in loss of substantial amounts of tuna flesh during cleaning of the fish after cooking has been completed.

After all the tuna fish in the particular cooker has been completely cooked the cooking steam is shut off and the cookers allowed to cool. The hot trays will then be removed from the cooker and the tuna fish 41 removed from such trays and forwarded to a cleaning table where the skin is removed from the fish and any damaged flesh adjacent the skin scraped away.

The tray bodies 21 are then washed, it being realized that the pre-coating thereof by the vegetable releasing agent enables rapid and effective washing in a convenient manner. The integral sheet-like characteristics of the tray bodies 21 enables the trays to be cleaned thoroughly on all surfaces to thereby avoid build-up of charred residue as frequently happened in the use of the prior art wire gridwork baskets thereby resulting in subsequent flaking off of the charred material during subsequent cooking processes and resulting in contamination of the tuna by such charred material.

The tray bodies 21 may then conveniently be stacked on one another as shown in FIGS. 6 and 7 for convenient storage with the nesting ears 57 of the upper trays nested directly on the flanges 59 of the lower trays with the respective handles 49 of the upper trays located above the respective end lips 51 of the respective lower trays for convenient access when such trays are to be retrieved for subsequent use.

From the foregoing it will be apparent that the cooking tray set of present invention provides an economical and convenient means for commercial cooking of foodstuffs in a large volume cooker which provides for stacking the trays in vertical relationship over one another while protecting the foodstuffs in the lower trays from damage by the hot cooking juices released from the foodstuff in the upper trays. Additionally, the cooking trays of the set of present invention can be easily cleaned in a very thorough manner to thereby provide for sanitary cooking of the foodstuff.

Various modifications and changes may be made with respect to the foregoing detailed description without departing from the spirit of the invention.

We claim:

1. A set of cooking trays for cooking juicy foods and comprising:
    a plurality of tray bodies including respective bottom walls formed with raised central support sheets, recessed drain channels extending around the peripheries of the respective support sheets for receipt of cooking juices drained from the respective sheets, and respective side walls surrounding said channels and tapered upwardly and outwardly to form an open top, said side walls being formed centrally in their vertical lengths with a plurality of outwardly projecting ears and juice outlet means disposed at a lower elevation than said respective support sheets for passage of juices draining from said channels during cooking of said food whereby said food may be placed on said respective sheets, said trays supported in stacked relationship, one above the other in a cooker with food in the respective lower trays sheltered beneath the sheets of the respective upper trays while said juice outlet means provide for drainage of cooking juices.

2. A set of cooking trays as set forth in claim 1 wherein:
    said bodies are rectangularly shaped in plan view and said side walls are formd in their lower extremities with respective outlets in the respective corners.

3. A set of cooking trays as set forth in claim 1 wherein:
    said side walls are formed at their opposite ends with handles.

4. A set of cooking trays as set forth in claim 1 wherein:
    said trays are at least 10 inches by 25 inches in plan view.

5. A set of cooking trays as set forth in claim 1 wherein:
    said sheet, channels and side wall are integrally formed.

6. A set of cooking trays as set forth in claim 1 wherein:
    said outlets extend downwardly to the bottom of said respective channels.

7. Cooking apparatus for cooking juicy foods and comprising:
    a plurality of trays stacked substantially one above the other, said trays including respective bottom walls formed with raised continuous central support sheets for supporting said foods and for receiving juices emitted therefrom during cooking, recessed drain channels extending around the peripheries of the respective support sheets for collecting juices drained from said respective sheets during cooking of said food, respective vertically projecting side walls extending around the outer peripheries of the respective channels, and respective juice outlet means formed by said respective trays at a lower elevation than said support sheets and disposed out of vertical alignment with said respective support sheets; and
    support racks for supporting said trays in vertically stacked relationship one above the other whereby said food may be supported on said respective support sheets and upon heating thereof for cooking, juices from the food of the respective upper trays will be captured on the respective support sheets and directed into the respective drain channels, from where they may drain out said outlets with the juices from the upper trays clearing foods supported on the support sheets of lower trays.

8. Cooking apparatus as set forth in claim 7 wherein:
    said bodies are rectangularly shaped in plan view and said side walls are formed in their lower extemeities with respective outlets in the respective corners thereof.

9. Cooking apparatus as set forth in claim 7 wherein:
    said side walls are formed with recessed handles disposed at the opposite ends of said bodies.

* * * * *